(12) United States Patent
Kiefer et al.

(10) Patent No.: US 12,350,755 B2
(45) Date of Patent: Jul. 8, 2025

(54) METHODS FOR PROVIDING PANEL PLANNING GEOMETRY DATA AND LASER FLATBED MACHINES FOR CUTTING OUT WORKPIECES

(71) Applicants: TRUMPF Werkzeugmaschinen GmbH + Co. KG, Ditzingen (DE); Fraunhofer-Gesellschaft zur Foerderung der angewandten Forschung e.V., Munich (DE)

(72) Inventors: Manuel Kiefer, Sinsheim (DE); Willi Poenitz, Leonberg (DE); Marc Teschner, Stuttgart (DE)

(73) Assignees: TRUMPF Werkzeugmaschinen SE + Co. KG, Ditzingen (DE); Fraunhofer-Gesellschaft zur Foerderung der angewandten Forschung e. V., Munich (DE)

( * ) Notice: Subject to any disclaimer, the term of this patent is extended or adjusted under 35 U.S.C. 154(b) by 893 days.

(21) Appl. No.: 17/348,273

(22) Filed: Jun. 15, 2021

(65) Prior Publication Data

US 2021/0308787 A1  Oct. 7, 2021

Related U.S. Application Data

(63) Continuation of application No. PCT/EP2019/086404, filed on Dec. 19, 2019.

(30) Foreign Application Priority Data

Dec. 21, 2018 (DE) .......................... 102018133524.5

(51) Int. Cl.
*B23K 26/03* (2006.01)
*B23K 26/38* (2014.01)
(Continued)

(52) U.S. Cl.
CPC ............ *B23K 26/032* (2013.01); *B23K 26/38* (2013.01); *G06T 7/0004* (2013.01); *G06T 7/13* (2017.01);
(Continued)

(58) Field of Classification Search
None
See application file for complete search history.

(56) References Cited

U.S. PATENT DOCUMENTS 5,508,936 A * 4/1996 King .......................... B26F 1/38
382/296
5,897,275 A * 4/1999 Sella .................... B23Q 15/225
409/164

(Continued)

FOREIGN PATENT DOCUMENTS

CN   105899322 A   8/2016
CN   107838697 A   3/2018
(Continued)

OTHER PUBLICATIONS

JP Office Action in Japanese Appln. No. 2021535253, mailed on Sep. 25, 2023, 11 pages (with English translation).

(Continued)

*Primary Examiner* — Ariel Mercado-Vargas
(74) *Attorney, Agent, or Firm* — Fish & Richardson P.C.

(57) ABSTRACT

The disclosure provides methods for providing panel planning geometry data for planning a laser cutting process. The methods include producing an image recording of a remaining panel-shaped material, e.g., wherein the remaining panel was processed by a laser flatbed machine and has inner cutout regions, evaluating the image recording to determine a remaining panel outer contour, evaluating the image recording to determine an inner cutout region, wherein the inner cutout region is determined by an inner cutout contour (Continued)

identified in the image recording, deriving a remaining area of the remaining panel using the outer contour and the inner cutout region, wherein a laser cutting process can be based on the remaining area, and outputting panel planning geometry data, which define the geometry of the remaining area. Laser flatbed machines for cutting workpieces out of panel-shaped materials using a laser beam and the methods disclosed herein are also described.

17 Claims, 4 Drawing Sheets

(51) Int. Cl.
  *G06T 7/00* (2017.01)
  *G06T 7/13* (2017.01)
  *G06T 7/62* (2017.01)
(52) U.S. Cl.
  CPC ...... *G06T 7/62* (2017.01); *G06T 2207/30164* (2013.01)

(56) References Cited

U.S. PATENT DOCUMENTS

| | | | |
|---|---|---|---|
| 6,681,151 B1* | 1/2004 | Weinzimmer | B25J 9/1697 356/243.1 |
| 9,895,819 B1 | 2/2018 | Aminpour | |
| 10,307,875 B2 | 6/2019 | Schmauder et al. | |
| 10,618,216 B2* | 4/2020 | Guimbretiere | B29C 64/223 |
| 11,009,856 B2 | 5/2021 | Kiefer et al. | |
| 2002/0173876 A1* | 11/2002 | Fisher | H05K 13/0812 700/245 |
| 2003/0118229 A1* | 6/2003 | Andrews | B23Q 35/128 382/141 |
| 2008/0101687 A1 | 5/2008 | Goeller | |
| 2011/0316977 A1 | 12/2011 | Pienaar | |
| 2014/0160273 A1 | 6/2014 | Jedynak et al. | |
| 2016/0354886 A1* | 12/2016 | Grob | B23Q 1/0009 |
| 2018/0079041 A1 | 3/2018 | Schmauder | |
| 2020/0208989 A1 | 7/2020 | Ottnad et al. | |
| 2021/0229308 A1 | 7/2021 | Ottnad et al. | |

FOREIGN PATENT DOCUMENTS

| | | |
|---|---|---|
| DE | 102007018416 | 4/2008 |
| DE | 202009005329 | 7/2009 |
| DE | 102009012543 | 9/2010 |
| DE | 102012106156 | 1/2014 |
| DE | 102016117681 | 3/2018 |
| DE | 102016120131 | 4/2018 |
| DE | 102017120382 | 10/2018 |
| DE | 102018126077 | 4/2020 |
| EP | 1342527 | 9/2003 |
| EP | 2441547 A1 | 4/2012 |
| EP | 2590040 | 5/2013 |
| JP | H05123863 A | 5/1993 |
| JP | H11320143 | 11/1999 |
| JP | 2003-251464 A | 9/2003 |
| JP | 2014083594 A | 5/2014 |
| JP | 6029928 B2 | 11/2016 |
| JP | 2013-039591 | 1/2017 |
| WO | WO 2018/073419 | 4/2018 |

OTHER PUBLICATIONS

JP Japanese Office Action in Japanese Appln. No. 2021535253, dated Jul. 20, 2022, 8 pages (with English translation).
CN Office Action in Chinese Appln. No. 201980084954.6, dated May 26, 2023, 17 pages (with English translation).
DE Office Action in German Appln. No. 102018133524.5, dated Oct. 1, 2019, 18 pages (with English translation).
PCT International Search Report and Written Opinion in International Appln. No. PCT/EP2019/086404, dated Mar. 30, 2020, 30 pages (with English translation).
JP Japanese Office Action in Japanese Appln. No. 2021535253, dated Mar. 7, 2023, 12 pages (with English translation).

* cited by examiner

METHODS FOR PROVIDING PANEL PLANNING GEOMETRY DATA AND LASER FLATBED MACHINES FOR CUTTING OUT WORKPIECES

CROSS REFERENCE TO RELATED APPLICATIONS

This application is a continuation of and claims priority under 35 U.S.C. § 120 from PCT Application No. PCT/EP2019/086404, filed on Dec. 19, 2019, which claims priority from German Application No. 10 2018 133 524.5, filed on Dec. 21, 2018. The entire contents of each of these priority applications are incorporated herein by reference.

TECHNICAL FIELD

The present disclosure relates to methods for providing panel planning geometry data, e.g., for planning and carrying out laser cutting processes. Furthermore, the disclosure relates to laser flatbed machines for cutting workpieces out of a panel-shaped material using a laser beam.

BACKGROUND

Workpieces can be cut, for example, out of a raw sheet material, using a laser flatbed machine (also referred to as a laser cutting machine) in a laser cutting process. A laser cutting beam is guided according to a cutting plan over the raw sheet. The cutting plan comprises in particular the path of the laser cutting beam over the raw sheet. The path is defined in a planning phase and determines, for a previously planned arrangement of workpieces, how they are to be cut out of a raw sheet material.

Before beginning a cutting process, the location of a raw sheet is compared to the cutting plan as an example of a raw panel to be cut. A location determination of the raw sheet with respect to the machine coordinate system can be carried out at the main time, for example, after placement of the sheet panel and shortly before the cutting process. The location determination can also be omitted if the location of the raw sheet to be cut is defined by fixed stop positions.

JP 2013-039591 A discloses the use of a camera for recognizing a material to be cut in a cutting region with the aid of base points, which are provided in the cutting region and can be recognized in a recorded image of the camera.

DE 10 2016 117681 A1 discloses, inter alia, a pallet changer, which permits two pallets received by a base frame to be introduced alternately into a processing device, so that a plate-shaped material resting on the respective pallet can be processed.

SUMMARY

The present disclosure provides methods of using a remaining panel-shaped material, e.g., a remaining raw sheet of material, e.g., metal, from which material has been removed, but is still usable for a cutting process using a laser cutting machine. For example, a chronologically efficient implementation of multi-panel allocations is to be enabled to integrate postproduction of, for example, small batch sizes into the operation of laser cutting machines.

In one aspect, the disclosure provides methods for providing panel planning geometry data for the planning of a laser cutting process to be carried out using a laser flatbed machine that include producing an image recording of a remaining panel-shaped material using an imaging systems, such as one or more cameras or a stereo camera or a lidar (laser imaging, detection, and ranging) scanner, e.g., wherein the remaining panel-shaped material was processed by the laser flatbed machine, and has inner cutout regions from which cut material was removed, evaluating the image recording to determine a remaining panel outer contour of the remaining panel, evaluating the image recording to determine an inner cutout region of the remaining panel located inside the remaining panel outer contour, wherein the inner cutout region is determined by an inner cutout contour identified in the image recording and/or by a threshold value analysis of the image recording, deriving a remaining area of the remaining panel using the remaining panel outer contour and the inner cutout region, wherein the remaining area can underlie a laser cutting process, and outputting panel planning geometry data which define the geometry of the remaining area.

In some embodiments of the methods for providing panel planning geometry data, the image recording is evaluated with respect to edge courses, wherein an outer circumferential edge determining the remaining panel outer contour and an inner circumferential edge or inner circumferential edge sections delimiting the inner cutout contour are identified in the image recording and stored in the panel planning geometry data as an outer circumferential edge line and inner circumferential edge line. The inner circumferential edge line delimits an inner cutout region of the remaining panel.

In some embodiments of the methods for providing panel planning geometry data, the threshold value analysis includes analyzing pixel values of the image recording with respect to openings within the remaining panel outer contour. The threshold value analysis optionally includes a blob analysis, which outputs at least one coherent pixel region, the grayscale value distribution of which is associated in the panel planning geometry data with an inner cutout region of the remaining panel, which is excepted from a cutting process to be planned.

In some embodiments, the methods for providing panel planning geometry data furthermore comprises the following steps: calculating a translational and/or rotational transformation of the remaining panel outer contour in relation to the machine zero point and outputting the translational and rotational transformation as part of the panel planning geometry data.

In some embodiments of the methods for providing panel planning geometry data, the image recording comprises a plurality of remaining panels, for each of which a remaining area is derived and output as panel planning geometry data.

In a further aspect, the disclosure provides methods for creating a cutting plan for a cutting process on a remaining panel. In certain embodiments of these methods, panel planning geometry data are provided according to the method described herein, cutting contours are arranged on the remaining area determined by the panel planning geometry data, and the cutting plan is created using position data of the cutting contours and optionally the panel planning geometry data and/or data of the translational and/or rotational transformation.

In some embodiments of the methods for creating a cutting plan, the cutting contours are arranged on the remaining area determined by the panel planning geometry data manually by an operator in an image-based manner, or with the aid of a nesting method for arranging two-dimensional spaces that are associated with workpiece geometries to be cut.

In a further aspect, the disclosure provides methods for cutting workpieces out of a panel-shaped material using a laser beam in the context of a cutting process. These methods include outputting a pallet from a panel cutting unit of the laser flatbed machine, wherein a processed panel lies on the pallet, which comprises cut material and the remaining panel surrounding the cut material, and sorting out the cut material, so that the remaining panel is exposed and the remaining panel is arranged on the pallet for producing an image recording. The remaining panel is provided, e.g., in a recording region of the imaging system, e.g., camera, and carrying out a method described herein for creating a cutting plan, reading the cutting plan into a control unit of the laser flatbed machine, retracting the pallet with the remaining panel into the panel cutting unit of the laser flatbed machine, and carrying out a cutting process in accordance with the read cutting plan on the remaining panel.

In a further aspect, the disclosure provides methods for cutting workpieces out of a panel-shaped material using a laser beam of a laser flatbed machine in the context of a cutting process. These methods include providing a remaining panel on a pallet, which is associated with a panel cutting unit of the laser flatbed machine, in a recording region of an imaging system, e.g., camera, of the laser flatbed machine, carrying out a method described herein for creating a cutting plan, reading the cutting plan into a control unit of the laser flatbed machine, retracting the pallet with the remaining panel into the panel cutting unit of the laser flatbed machine, and carrying out a cutting process in accordance with the read-in cutting plan on the remaining panel.

In some embodiments of the methods for cutting out workpieces, during at least one of the steps of sorting out the cut material, include carrying out the method for creating a cutting plan, and reading in the cutting plan, a further panel is retracted into the panel cutting unit of the laser flatbed machine and cut into workpieces in a cutting process.

In a further aspect, the disclosure features laser flatbed machines for cutting workpieces out of a panel-shaped material using a laser beam. The laser flatbed machines include at least one pallet changer for providing a preparation region of a pallet for storing the panel-shaped material, an imaging system, e.g., one or more cameras, a stereo camera, a lidar scanner, or a time-of-flight camera, for producing an image recording of the pallet having the panel-shaped material positioned in the preparation region, a panel cutting unit, and a control unit for carrying out one of the methods as disclosed herein.

In some embodiments of the laser flatbed machines, the camera is attached to the panel cutting unit and image recordings of the camera are spatially calibrated with respect to a machine coordinate system of the panel cutting unit.

The concepts described herein relate, e.g., to cutting workpieces out of raw material panels made of a metal, e.g., steel, aluminum, or copper, or a metal alloy. Glasses, functional ceramics, plastics, organic materials, or other materials can also be used as raw material for laser cutting processes.

One advantage of the concepts described herein is that— in contrast to conventional measuring methods for sheet location acquisition—they can manage without specific conditions for an acquisition and alignment of the sheet location. For example, no restrictions or noncompulsory restrictions may be given in the sheet placement. The requirement of perpendicular outer edges for the use of stops or the required arrangement of a sheet in a predetermined region (the so-called loading corner(s) of a pallet) can thus be dispensed with.

Furthermore, the sheet dimensions in known laser cutting machines are not acquired outside the cutting zone, e.g., in the region of the pallet, so that remaining areas also cannot be ascertained for right-angled sheets. In contrast thereto, the concepts described herein permit an acquisition of remaining areas, e.g., acquisition of remaining raw sheet areas, in the panel preparation region of the laser cutting machine. The acquisition can be carried out without markers and independently of the panel geometry and the location/ the position.

Furthermore, it is possible to check whether a global nesting measure (TARGET area of the nesting plan) of a cutting process matches with the ascertained remaining area (available ACTUAL area). A possible comparison of TARGET area and ACTUAL area offers safety and comfort when carrying out the cutting process. The risk of process disturbances such as collisions of the laser head with cutout parts, which can be induced because of incorrect estimation of the geometry or due to the omission of manual measurements, can thus be reduced.

Furthermore, material reserves can be reduced or even dispensed with entirely in the planning of the arrangement of cutting contours, since a risk reduction no longer has to be performed by an operator. The raw material can accordingly be utilized better, the material efficiency can increase, and process disturbances can be reduced.

Further advantages and advantageous configurations of the subject matter of the invention are evident from the description, the claims, and the drawings. Likewise, the features mentioned above and those presented further below can each be used by themselves or as a plurality in any combinations. The embodiments shown and described should not be understood as an exhaustive enumeration, but rather are of exemplary character for outlining the invention.

DESCRIPTION OF DRAWINGS

Further features and their functionalities result from the following description of embodiments on the basis of the figures.

DETAILED DESCRIPTION

Aspects described herein are partially based on the finding that an image acquisition system of cut material, as is used, for example, in sorting out workpieces using an optical assistance system, can also be used for the planning of a cutting process. To assist the sorting of cut material, pallets are monitored using an imaging system, e.g., one or multiple cameras, outside the processing zone of the laser cutting machine. It is proposed herein that image recordings be used for the determination of the geometry of the remaining panel. Moreover, it is proposed that existing inner cutouts be acquired automatically on the basis of the recorded image for a remaining panel that is to be introduced next into a processing zone.

According to one aspect, an image of an already processed raw sheet (as an example of a remaining panel) is recorded using an imaging system, wherein the raw sheet lies ready on a pallet outside the processing zone of the laser cutting machine for planning a further cutting process. One or more cutout workpieces have already been sorted out from the already processed raw sheet, so that the raw sheet is provided in the form of a remaining grid having corresponding openings/holes and an arbitrary outer contour course. The recorded image can be used to perform a planning of a cutting process on the remaining grid in parallel to the main processing time, for example, during a cutting process running simultaneously in the laser cutting machine. The imaging system can be or include one or more cameras, or a stereo camera. The imaging system can also include a time-of-flight camera (see, e.g., WIKIPEDIA™ an online encyclopedia—Time-of-flight camera) or a Lidar scanner. Lidar scanners, stereo cameras, and time-of-flight cameras produce 3D-images, which makes it easy to distinguish between the surface of the remaining panel and the pallet.

For this purpose, the remaining area still available of the remaining grid is derived with the aid of the recorded image. The derived remaining area represents a two-dimensional planning space. In the planning of the cutting plan, the remaining area available for a further cutting process is occupied with two-dimensional geometries of the workpieces that are to be cut out of the remaining panel. For this purpose, a worker can arrange workpiece geometries on the remaining area via an input interface. Alternatively or additionally, an automated arrangement of workpieces on the remaining area can be carried out in the planning space, e.g., using a nesting algorithm. One useful example of a nesting algorithm for automating the nesting is disclosed in German patent application DE 10 2018 126 077.6 of the applicant filed on Oct. 19, 2018, which is incorporated herein by reference in its entirety.

As the outer contour and the inner contours are acquired, the positioning of workpiece geometries can be restricted to the unprocessed sheet surface in the post-production. It can thus be ensured that workpieces are not nested over already cut contours.

For the concepts presented herein, for example, image acquisition using a camera system can be used, e.g., as described in DE 10 2016 120 131 A1, which is incorporated herein by reference in its entirety, for assistance when sorting out workpieces.

Using an image processing algorithm on an image recording of the pallet with the remaining panel, the current location of the remaining panel on the pallet and the location in relation to a zero point of the reference system of the laser cutting machine can be determined. For example, a rotation of a remaining panel or a translation of the remaining panel is determined with respect to a zero point that is associated with the pallet and/or the reference system.

It is proposed herein that in addition to the location, inner cutouts or blob regions which were cut into the remaining panel be acquired using an image processing algorithm. The inner cutouts substantially determine the remaining area available for a further laser cutting process. With the knowledge of these inner cutout regions, further workpieces to be cut can be arranged on the remaining panel in such a way that an overlap of the workpieces with the inner cutout regions is avoided. Small remaining areas can thus also be used for a postproduction of, for example, small batch sizes (low piece counts).

Figure 1:
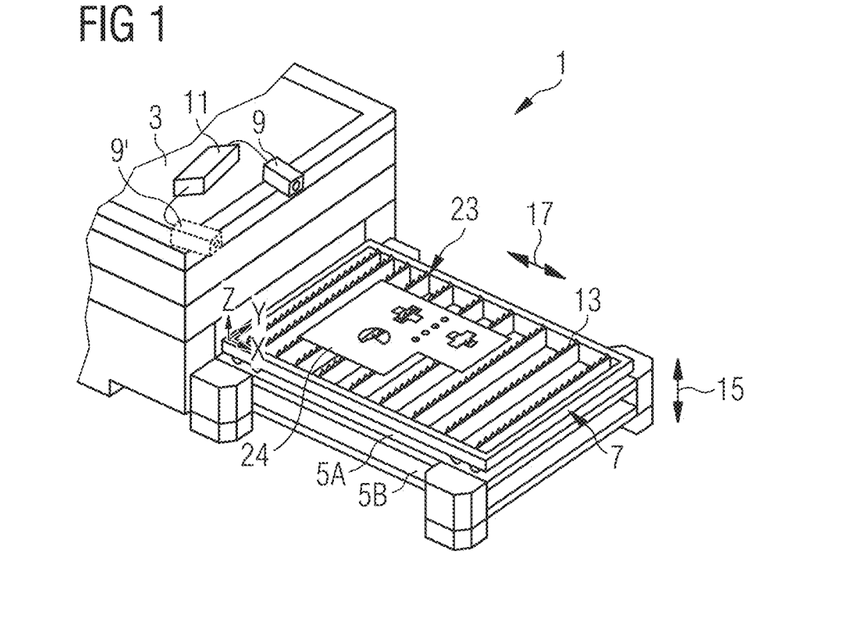
FIG. 1 is a schematic three-dimensional illustration of a pallet that is ready to be retracted into a laser flatbed machine as described herein and is loaded with a remaining panel.

FIG. 1 shows a laser flatbed machine 1 having a panel cutting unit 3, which represents the machine region in which the cutting process is carried out.

Furthermore, an upstream pallet changer can be seen, which permits the operation of the laser flatbed machine 1 to be carried out using multiple pallets. For example, the pallet changer provides two pallet positions 5A, 5B located one over the other. In FIG. 1, a pallet 7 is located in the upper pallet position 5A, using which a remaining panel 23 is to be retracted into the panel cutting unit 3 for a further cutting process.

An imaging system, e.g., a camera or stereo camera, 9 is attached centrally with respect to the pallet changer on the panel cutting unit 3. The camera 9 enables imaging acquisition of the upper side of the pallet 7 located in the upper pallet position 5A and thus permits an image of the surface 24 of the remaining panel 23 to be recorded. In general, multiple cameras can be used. For example, a second camera 9' is indicated by dashed lines in FIG. 1 laterally on top on the panel cutting unit 3. The cameras 9, 9' transmit image data to a control unit 11 of the laser flatbed machine 1.

The pallet 7 comprises, for example, a rectangular pallet frame having short and long side sections. The pallet 7 furthermore comprises an arrangement of support webs 13. The support webs 13 are fastened on the pallet frame on the long side sections and accordingly extend in parallel to the short side sections. A material to be cut can be deposited on the support webs 13.

For a laser cutting process, the pallet can be moved along a pallet insertion direction 17 into the panel cutting unit 3. The pallet positions 5A, 5B can be displaced along the pallet exchange direction 15 in order to position the respective required pallet position with respect to the panel cutting unit 3. For efficient operation of the laser flatbed machine 1, one pallet can be positioned in the panel cutting unit 3 and one can be positioned in front of the panel cutting unit 3. The pallet changer shown permits operation of the laser flatbed machine 1 with two pallets from one side. Alternatively, a pallet changer can be provided on each of opposing sides of the panel cutting unit 3, so that the laser flatbed machine 1 can be operated from two sides. Reference is made by way of example to DE 10 206 117 681 A1 for exemplary embodiments of pallet changers.

Figure 3:
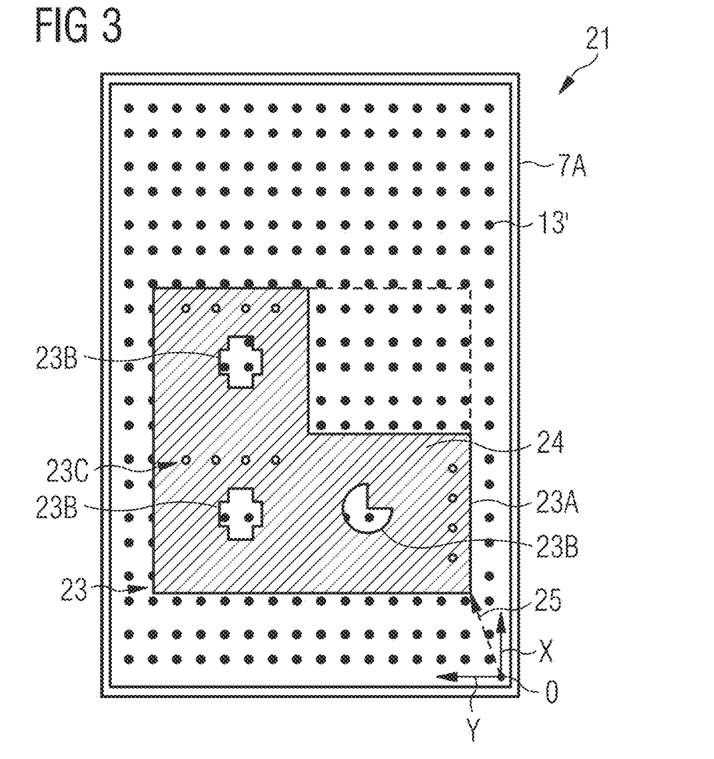
FIG. 3 is a schematic illustration of a top view of the pallet with the remaining panel from FIG. 1.
Figure 4:
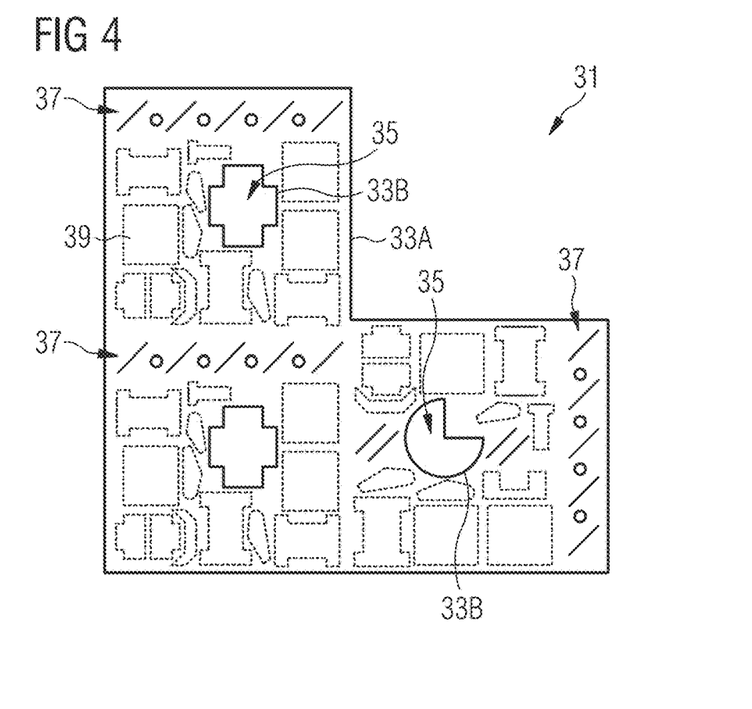
FIG. 4 is a schematic illustration of panel planning geometry data that are associated with the geometry of the remaining panel shown in FIG. 3.

The camera 9 is used according to the concepts disclosed herein for obtaining panel planning geometry data (see FIG. 4). For this purpose, an image recording 21 (see FIG. 3) of the remaining panel 23 is evaluated. The image recording 21 is acquired when the remaining panel 23 is ready on the pallet 7 for a subsequent cutting process.

Figure 2:
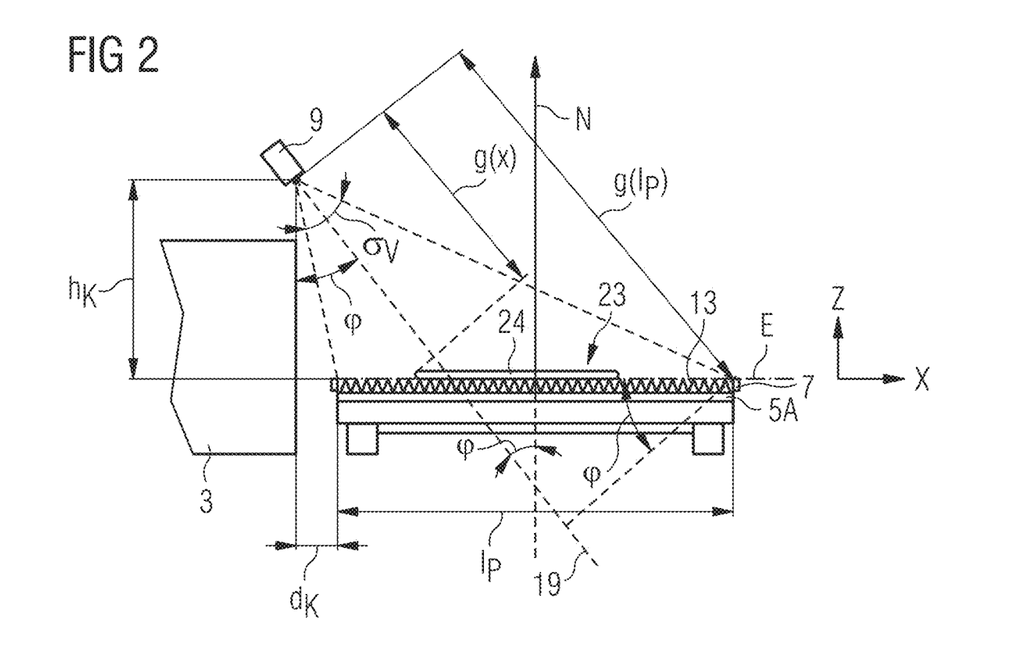
FIG. 2 is a schematic sectional view to illustrate geometrical parameters for the image recording of the pallet using an imaging system attached to the laser flatbed machine.

FIG. 2 illustrates the various geometrical parameters underlying the image recording 21 (e.g., as shown in FIG. 3). Thus, the camera 9 is located at a height hK in the Z direction above the arrangement of support webs 13. Furthermore, a length 1P of the pallet 7 is shown, wherein one end of the pallet 7 is located at a distance dK in the X direction in front of the camera 9. The pallet 7 is associated with a normal direction N and support surfaces of the support webs 13 form a plane E, which extends in the X-Y plane (for example Z=0).

To acquire the complete pallet 7, the camera 9 requires an aperture angle σV, wherein a recording direction 19 is defined centrally in the aperture angle σV. The recording direction 19 extends at an angle φ to the normal direction N. A maximum pallet distance g(lP) (measured in parallel to the recording direction 19) and a distance g(x) of a closest end of the remaining panel 23 are also indicated. The image recorded by camera 9 includes the surface 24 of the remaining panel 23 on the pallet.

Based on these geometric conditions, the image recording 21 can be rectified in its geometry as in FIG. 3. The position and orientation of the remaining panel 23 can thus be acquired via the camera system. If the camera 9 is furthermore calibrated on a machine coordinate system of the panel cutting unit 3 (i.e., a transformation of image coordinates into machine coordinates is provided), the recorded images and, e.g., the acquired remaining panel 23 can be placed in relation to the machine reference system. If multiple imaging systems, e.g., cameras, are used, the images can be assembled to form a coherent image.

In the schematic image recording 21 of the pallet 7 shown in FIG. 3, a rectangular frame 7A can be seen, which delimits the pallet 7, as well as the support regions 13' of the support webs 13 arranged uniformly in the frame 7A.

The image recording 21 furthermore shows a surface 24 of the remaining panel 23. The remaining panel 23 has a remaining panel outer contour 23A in an L shape. The remaining panel 23 has three openings as examples of large inner cutouts, the inner cutout contours 23B of which correspond to the shape of cutout workpieces. The workpieces were already removed from the remaining panel 23. Furthermore, rows of four smaller holes 23C each can be seen as examples of small inner cutouts.

For completeness, a zero point 0 of a pallet coordinate system is shown on the image recording 21, which establishes the reference of the pallet to the machine coordinate system. As an example of a translational and/or rotational transformation, which is to be taken into consideration with respect to the location of the remaining panel 23 for the cutting process, an arrow 25 illustrates a displacement vector from the zero point 0 to a closest corner of the remaining panel 23.

FIG. 4 illustrates the content of panel planning geometry data 31. The panel planning geometry data 31 comprise an outer circumferential edge line 33A of the remaining panel 23 and multiple inner circumferential edge lines 33B, which are associated with large inner cutouts (inner cutout regions 35). The edge lines were, and can be, acquired, for example, using image processing algorithms of edge detection, such as, for example, the "Canny edge detector" (see, e.g., docs.opencv.org/3.4/da/d22/tutorial_py_canny; the Discrete Laplace operator (see, e.g., WIKIPEDIA™, an online encyclopedia—Discrete_Laplace_operator#Image_processing); and the Hough transform (for lines and circles)(see, e.g., WIKIPEDIA™, an online encyclopedia—Hough transform).

Furthermore, the panel planning geometry data 31 comprise three small cutout regions 37, which were defined in the region of the holes 23C, in that, for example, 4 blobs were roughly combined in each case.

The remaining area of the remaining panel 23 is formed by the region located inside the outer circumferential edge line 33A, outside the inner circumferential edge lines 33B, and not in the region of the small cutout regions 37. The remaining area is still available for further workpieces to be cut out.

To illustrate a cutting plan, as can be created, for example, using the nesting algorithm mentioned above, cutting contours 39 for differently shaped workpieces are indicated by dashed lines in FIG. 4. The cutting contours 39 were distributed on the remaining area in such a way that there is no overlap with the outer circumferential edge line 33A, the inner circumferential edge lines 33B, and the small cutout regions 37. The required workpieces can accordingly be cut completely out of the remaining panel 23.

Figure 5A:
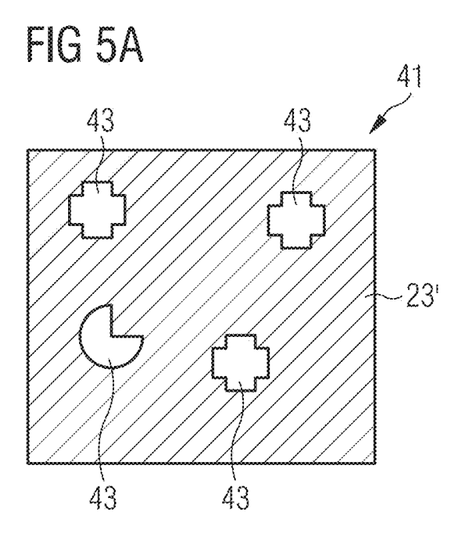
FIGS. 5A-5C are schematic illustrations to determine inner cutout regions.
Figure 5B:
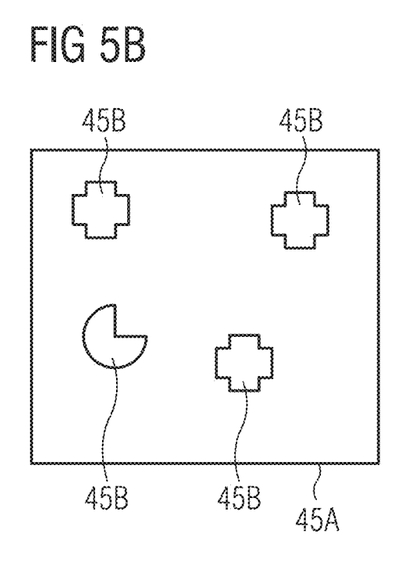
Figure 5C:
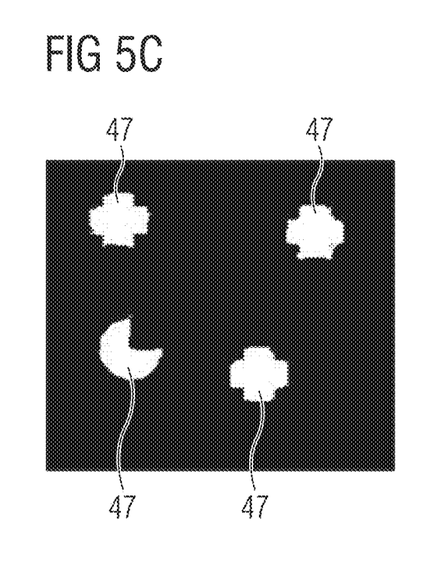

FIGS. 5A to 5C illustrate evaluation methods of the image recordings of the camera 9. FIG. 5A shows an image recording 41 of a remaining panel 23' having four openings 43, which result from cutting out correspondingly shaped and already removed workpieces.

FIG. 5B shows an outer circumferential edge line 45A and four inner circumferential edge lines 45B, which have been obtained with the aid of an edge algorithm running via the image data of the image recording. This presumes a correspondingly high-contrast imaging of the openings 43 in the image recording 41. Greatly varying algorithms are usable for the detection of edges of large inner cutouts, for example, the so-called "Canny edge detector," the Discrete Laplace operator, and/or the Hough transform. However, edge algorithms are not always robust in the case of reflective surfaces of sheets, and for better detection, one can use additional cameras and/or stereo cameras. With respect to the remaining panel shape, the outer circumferential edge line can also deviate from a rectangular shape, since the image processing algorithms can also acquire nonrectangular panel geometries.

In the case of lower-contrast recordings or if only small openings (inner cutouts) are to be identified, a threshold value analysis of the image recording, e.g., a blob algorithm, can be applied to the image. A blob is understood herein as a region in an image that is not clearly delimited from the surroundings and does not output an edge line or does not output an unambiguous edge line for an edge algorithm. Blob algorithms can be used in images having binary pixel values. Binary images can be generated automatically from the grayscale values of the pixels of the original image, for example, by threshold value formation. Blob regions represent regions that have an elevated probability that laser processing has already taken place there. In other words, pixels, the grayscale values of which are above, below, or in the bandwidth of a threshold value, can be assessed in a binary manner with "1" by means of a threshold value formation, whereas all other pixels are set to "0". Coherent pixels having value "1" are combined into blobs via further parameters, for example the number of coherent pixels, a minimum and maximum area size of a blob, and possible shapes.

Using blob algorithms (see, e.g., WIKIPEDIA™, an online encyclopedia—Blob_detection), the area of the cutouts in the sheet or the sheet surface can be roughly acquired by a grayscale value difference in the pixels. However, the edges are not necessarily represented sharply due to noise and the threshold value. The remaining area can nonetheless be acquired approximately, so that interference regions, for example holes in the sheet, can be recognized and excluded for the subsequent processing in the placement of workpieces to be cut in the remaining panel.

FIG. 5C schematically shows blob structures 47, as can be produced using a threshold value analysis of the image recording 41 for the openings 43. In general, an exact statement about the contour shape cannot be made using a blob analysis. However, the dimensions of the openings can be estimated and positioning of parts during the postproduction over inner cutouts of small dimensions can be prevented.

Figure 6:
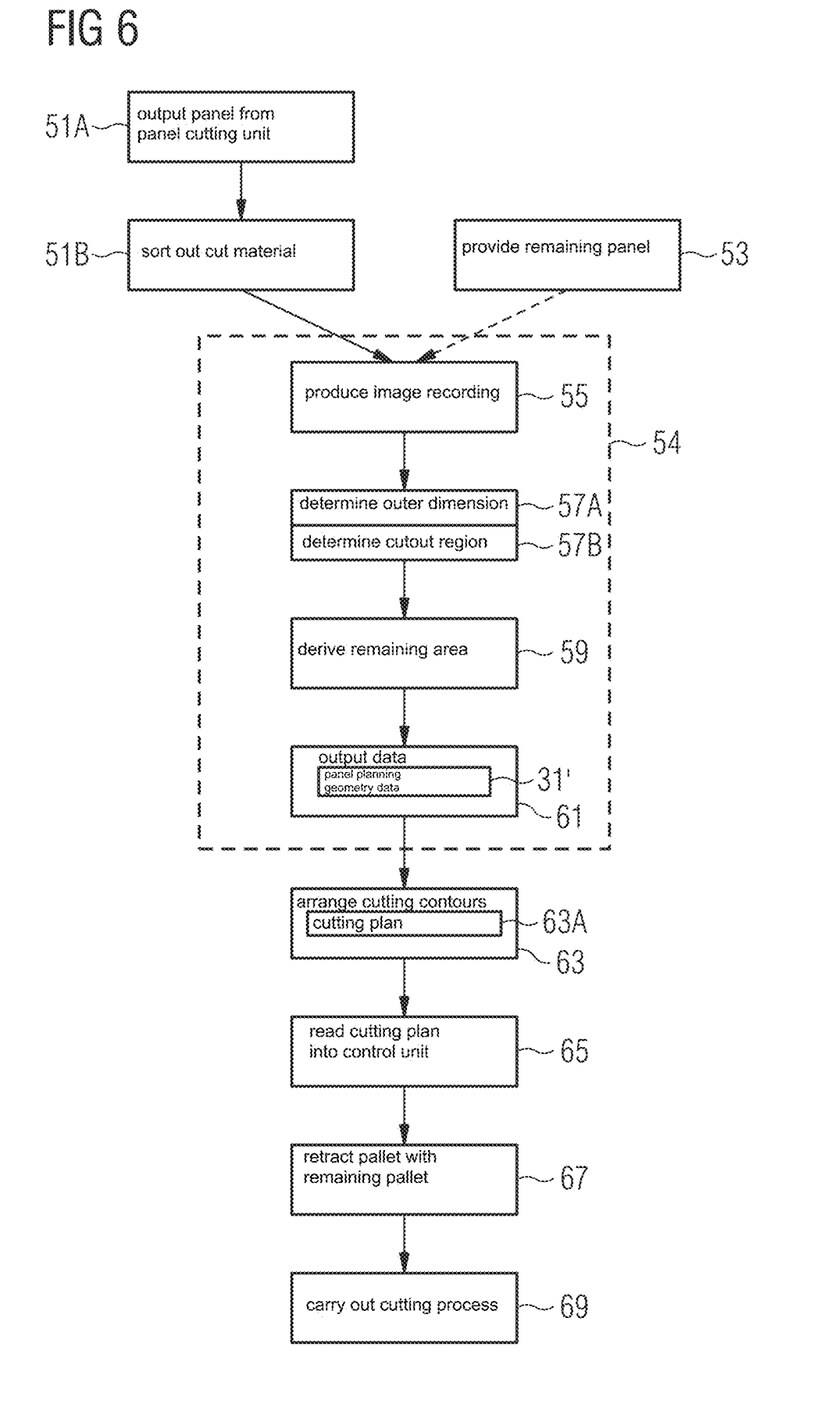
FIG. 6 is a flow chart to illustrate a method for cutting workpieces out of a panel-shaped material.

FIG. 6 illustrates various aspects in a flow chart, which can be incorporated individually or in groups into a method for cutting workpieces out of a panel-shaped material. In this case, the panel-shaped material is a so-called remaining panel of a cutting process that was previously carried out and does not form a continuous area, but rather has one or more inner cutout regions. An outer contour of the remaining panel can have, but does not have to have, a regular, for example, rectangular shape. In the context of the previously performed cutting process, an originally rectangular panel can have been divided into arbitrarily shaped remaining panels, of which one or more are to be used as remaining panels in a subsequent cutting process for further workpieces.

FIG. 6 combines multiple method steps of a method 54 for providing panel planning geometry data 31'. The panel planning geometry data 31' are provided for the planning of a laser cutting process to be carried out using a laser flatbed machine. According to the method 54, in a step 55, an image recording of a remaining panel is produced using a camera. The remaining panel preferably does not have any further workpieces to be sorted out; i.e., the cut material of a preceding cutting process was removed (sorted out). In a step 57A, the image recording is evaluated to determine an outer dimension of the remaining panel. For this purpose, a remaining panel outer contour of the remaining panel is determined, for example, as was explained in conjunction with FIG. 4B.

Furthermore, the image recording is evaluated to determine at least one inner cutout region located inside the remaining panel outer contour (step 57B).

A large inner cutout region can be recognized quite accurately in the image recording. This can be carried out, for example, by the identification of a closed inner cutout contour with the aid of edge detection algorithms, as have already been applied, for example, for the detection of the remaining panel outer contour on the image recording and have been explained in conjunction with FIG. 4B.

Furthermore, an inner cutout region in the image recording can possibly only be recognized with a certain level of fuzziness. This can occur in the case of inner cutout regions that are not accessible to an edge detection because of their (small) size or shape. For example, inner cutout regions can be determined using threshold value analyses of the image recording, as was explained in conjunction with FIG. 4C.

Using the determined remaining panel outer contour and the determined inner cutout region, a remaining area of the remaining panel is determined in step 59. The remaining area represents the area of the remaining panel on which a laser cutting process can be based and out of which further workpieces can be cut.

For the planning of which workpieces are to be cut out of the remaining panel as arranged, in a step 61, panel planning geometry data 31' are output, which define the geometry of the remaining area. The panel planning geometry data 31' can furthermore comprise translational and/or rotational transformation, which defines the location of the remaining panel outer contour in a machine coordinate system.

The output panel planning geometry data 31' can be used in a method for creating a cutting plan 63A for a following cutting process. In a step 63, cutting contours of parts are arranged on the remaining area determined by the panel planning geometry data 31'. This can be carried out manually by an operator in an image-based manner (for example using drop & cut routines) with the aid of a calibrated camera live image or using a nesting method for arranging two-dimensional spaces, which are associated with workpiece geometries to be cut.

The cutting plan 63A is then created using position data of the cutting contours and optionally the panel planning geometry data and/or the data of the translational and/or rotational transformation in a format, which can be read by a controller of a laser cutting machine and used for correspondingly moving the laser beam over the remaining panel.

In addition, for a comprehensive production sequence, it is to be noted that a method for cutting workpieces out of a panel-shaped material using a laser beam in the context of a following cutting process can furthermore have the following steps incorporating the method 54.

For example, in a step 51A, a pallet can be output from a panel cutting unit of a laser flatbed machine, wherein a processed panel lies on the pallet. The processed panel comprises cut material and a remaining panel surrounding the cut material. In a sorting out step 51B, the cut material is sorted out so that the remaining panel is exposed. The remaining panel now lies alone (or with other remaining panels) on the pallet and can be positioned accordingly for the production of an image recording. For example, the remaining panel, e.g., by moving the pallet, can be moved into a recording region of a camera of the laser flatbed machine. In the case of an occupancy with multiple remaining panels (multi-panel processing), all remaining panel areas and the occupancy thereof with workpieces to be cut out can be acquired jointly.

The method already outlined for creating a cutting plan 63A now takes place. The cutting plan 63A is read in a step 65 into a control unit of the laser flatbed machine and the pallet is retracted with the remaining panel in a step 67 into the panel cutting unit of the laser flatbed machine. In a step 69, a cutting process can now be carried out in accordance with the read-in cutting plan 63A on the remaining panel.

In some embodiments, steps 51A and 51B can be replaced by a step 53, in which a remaining panel is provided on a pallet in a recording region of a camera of a laser flatbed machine. For example, from a storage region of remaining grids, one remaining grid can be selected for the next cutting process.

It is to be noted that a further panel (new panel or remaining panel) can be retracted into the panel cutting unit of the laser flatbed machine and processed while the cut material is sorted out, the above method for creating a cutting plan is carried out, the created cutting plan is read in, etc.

In summary, a manual or promptly automated arrangement of parts to be cut simplifies the postproduction of small batch sizes. For this purpose, a calibrated camera is utilized, with which a cutting program can be manually or (partially) automatically created on the basis of a provided raw panel/remaining panel at the main time of the laser cutting machine. A calibrated camera live image used during the sorting out can be used for this purpose. A raw panel/remaining panel is preferably provided on a pallet close to the machine. For example, a cutting program can be carried out in parallel to the main time on the basis of the measurement of the panel location and panel area directly after the sorting out when the remaining sheet is still present or by placement of raw panel/remaining grid. This can result in a time saving of several seconds per panel, wherein the time saving increases with the number of the parts that can be cut later.

The detected edges can be tracked by the calibrated camera recordings in the event of shifts of the remaining panel on the pallet, but within the field of view of the camera. Furthermore, the translation and rotation of the remaining panel in relation to the machine zero point can be calculated on the basis of the calibration of the camera/the cameras.

In some embodiments, an image-overlaid representation of the panel to be cut next is displayed on the basis of a raw panel on the pallet. The operator can thus perform a visual comparison to the dimension of the cutting program and the nesting on the panel. If there is the option of a preview of the next cutting program, the operator can intervene to avoid errors and adapt the cutting plans. The concepts disclosed herein furthermore permit a size check as to whether a planned cutting program can be placed on a raw panel area to be used.

OTHER EMBODIMENTS

It is explicitly emphasized that all features disclosed in the description and/or the claims are to be viewed as separate and independent of one another for the purpose of the original disclosure and also for the purpose of restricting the claimed invention independently of the combinations of features in the embodiments and/or the claims. It is explicitly stated that all range specifications or specifications of groups of units disclose any possible intermediate value or subgroup of units for the purpose of the original disclosure and also for the purpose of restricting the claimed invention, in particular also as limits of a range specification.

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:

1. A method for providing panel planning geometry data for planning a laser cutting process to be carried out using a laser flatbed machine, the method comprising:
   outputting a pallet from a panel cutting unit of the laser flatbed machine, wherein a processed panel containing cut material and a remaining panel-shaped material surrounding the cut material lies on the pallet,
   providing the remaining panel-shaped material in a preparation region of the laser flatbed machine in a recording region of an imaging system, wherein the preparation region is separate from the panel cutting unit of the laser flatbed machine;
   using the imaging system to produce an image recording of the remaining panel-shaped material that has one or more inner cutout regions from which material has been removed;
   evaluating the image recording to determine a remaining panel outer contour of the remaining panel-shaped material;
   evaluating the image recording to determine at least one of one or more inner cutout regions of the remaining panel-shaped material located inside the remaining panel outer contour, wherein the at least one inner cutout region is determined by (i) an inner cutout contour identified in the image recording, (ii) a threshold value analysis of the image recording, or (iii) both by an inner cutout contour identified in the image recording and by a threshold value analysis of the image recording;
   deriving a remaining area of the remaining panel-shaped material using the remaining panel outer contour and the one or more inner cutout regions, wherein the laser cutting process can be based on the remaining area; and
   outputting panel planning geometry data that define the geometry of the remaining area,
   wherein during at least one of the steps above, using the panel cutting unit of the laser flatbed machine to cut a further panel-shaped material into workpieces in the laser cutting process.

2. The method of claim 1, wherein the remaining panel-shaped material was processed by the laser flatbed machine.

3. The method of claim 1, wherein the image recording is evaluated with respect to edge courses, wherein an outer circumferential edge determining the remaining panel outer contour and an inner circumferential edge or inner circumferential edge sections delimiting the inner cutout contour are identified in the image recording and stored in the panel planning geometry data as an outer circumferential edge line and an inner circumferential edge line, wherein the inner circumferential edge line delimits an inner cutout region of the remaining panel.

4. The method of claim 1, wherein the imaging system comprises one or more cameras, a stereo camera, a time-of-flight camera, or a lidar scanner.

5. The method of claim 4, wherein the threshold value analysis comprises a blob analysis, which provides at least one coherent pixel region in the panel planning geometry data, wherein a grayscale value distribution of the at least one coherent pixel region is associated with the inner cutout region of the remaining panel, which is excepted from the laser cutting process to be planned.

6. The method of claim 1, wherein the threshold value analysis comprises analyzing pixel values of the image recording with respect to openings inside the remaining panel outer contour.

7. The method of claim 1, further comprising:
   calculating a translational transformation or a rotational transformation, or both, of the remaining panel outer contour in relation to a machine zero point, and
   outputting the translational and rotational transformations as part of the panel planning geometry data.

8. The method of claim 1, wherein the image recording comprises an image recording of a plurality of remaining panel-shaped materials, for each of which the remaining area is derived and outputted as at least part of the panel planning geometry data.

9. The method of claim 1, wherein the imaging system is attached to the panel cutting unit and image recordings of the imaging system are spatially calibrated with respect to a machine coordinate system of the panel cutting unit.

10. A method for creating a cutting plan for a laser cutting process on a remaining panel-shaped material, the method comprising:
    providing panel planning geometry data for planning the laser cutting process to be carried out using a laser flatbed machine, wherein providing the planning geometry data comprises:
    outputting a pallet from a panel cutting unit of the laser flatbed machine, wherein a processed panel containing cut material and the remaining panel-shaped material surrounding the cut material lies on the pallet,
    providing the remaining panel-shaped material in a preparation region of the laser flatbed machine in a recording region of an imaging system, wherein the preparation region is separate from the panel cutting unit of the laser flatbed machine;

using the imaging system to produce an image recording of the remaining panel-shaped material that has one or more inner cutout regions from which material has been removed;

evaluating the image recording to determine a remaining panel outer contour of the remaining panel-shaped material;

evaluating the image recording to determine at least one of one or more inner cutout regions of the remaining panel-shaped material located inside the remaining panel outer contour, wherein the at least one inner cutout region is determined by (i) an inner cutout contour identified in the image recording, (ii) a threshold value analysis of the image recording, or (iii) both by an inner cutout contour identified in the image recording and by a threshold value analysis of the image recording;

deriving a remaining area of the remaining panel-shaped material using the remaining panel outer contour and the one or more inner cutout regions, wherein the laser cutting process can be based on the remaining area; and outputting panel planning geometry data that define the geometry of the remaining area, wherein during at least one of the steps above, using the panel cutting unit of the laser flatbed machine to cut a further panel-shaped material into workpieces in the laser cutting process; and arranging cutting contours on the remaining area determined by the panel planning geometry data, and creating a cutting plan using position data of the cutting contours.

11. The method of claim 10, wherein creating the cutting plan uses one or more of the panel planning geometry data, data of translational transformation, or data of rotational transformation.

12. The method of claim 10, wherein the cutting contours are arranged on the remaining area determined by the panel planning geometry data either
 (i) manually by an operator in an image-based manner, or
 (ii) using a nesting algorithm for arranging two-dimensional spaces associated with workpiece geometries to be cut.

13. A method for cutting workpieces out of a panel-shaped material using a laser beam in a cutting process, the method comprising:

creating a cutting plan for the laser cutting process on a remaining panel-shaped material, wherein creating the cutting plan comprises:

providing panel planning geometry data for planning the laser cutting process to be carried out using a laser flatbed machine, wherein providing the planning geometry data comprises:

outputting a pallet from a panel cutting unit of the laser flatbed machine, wherein a processed panel containing cut material and a remaining panel-shaped material surrounding the cut material lies on the pallet, providing the remaining panel-shaped material in a preparation region of the laser flatbed machine in a recording region of an imaging system, wherein the preparation region is separate from the panel cutting unit of the laser flatbed machine;

using the imaging system to produce an image recording of the remaining panel-shaped material that has one or more inner cutout regions from which material has been removed;

evaluating the image recording to determine remaining panel outer contour of the remaining panel-shaped material;

evaluating the image recording to determine at least one of one or more inner cutout regions of the remaining panel-shaped material located inside the remaining panel outer contour, wherein the at least one inner cutout region is determined by (i) an inner cutout contour identified in the image recording, (ii) a threshold value analysis of the image recording, or (iii) both by an inner cutout contour identified in the image recording and by a threshold value analysis of the image recording;

deriving a remaining area of the remaining panel-shaped material using the remaining panel outer contour and the one or more inner cutout regions, wherein the laser cutting process can be based on the remaining area; and outputting panel planning geometry data that define the geometry of the remaining area, wherein during at least one of the steps above, using the panel cutting unit of the laser flatbed machine to cut a further panel-shaped material into workpieces in the laser cutting process; and arranging cutting contours on the remaining area determined by the panel planning geometry data, and creating a cutting plan using position data of the cutting contours;

reading the cutting plan into a control unit of the laser flatbed machine;

retracting the pallet with the remaining panel into the panel cutting unit of the laser flatbed machine; and carrying out the laser cutting process according to the read-in cutting plan on the remaining panel.

14. A laser flatbed machine for cutting workpieces out of a panel-shaped material using a laser beam, the laser flatbed machine comprising:

at least one pallet changer for providing a preparation region of a pallet for storing the panel-shaped material;

an imaging system for producing an image recording of the pallet positioned in the preparation region with the panel-shaped material;

a panel cutting unit; and a control unit programmed to instruct the laser flatbed machine to provide panel planning geometry data for planning a laser cutting process to be carried out using the laser flatbed machine, wherein providing the panel planning geometry comprises:

outputting a pallet from the panel cutting unit of the laser flatbed machine, wherein a processed panel containing cut material and a remaining panel-shaped material surrounding the cut material lies on the pallet, providing the remaining panel-shaped material in a preparation region of the laser flatbed machine in a recording region of an imaging system, wherein the preparation region is separate from the panel cutting unit of the laser flatbed machine;

using the imaging system to produce an image recording of the remaining panel-shaped material that has one or more inner cutout regions from which material has been removed;

evaluating the image recording to determine a remaining panel outer contour of the remaining panel-shaped material;

evaluating the image recording to determine at least one of one or more inner cutout regions of the remaining panel-shaped material located inside the remaining panel outer contour, wherein the at least one inner cutout region is determined by (i) an inner cutout contour identified in the image recording, (ii) a threshold value analysis of the image recording, or (iii) both by an inner cutout contour identified in the image recording and by a threshold value analysis of the image recording;

deriving a remaining area of the remaining panel-shaped material using the remaining panel outer contour and the one or more inner cutout regions, wherein the laser cutting process can be based on the remaining area; and outputting panel planning geometry data that define the geometry of the remaining area, wherein during at least one of the steps above, using the panel cutting unit of the laser flatbed machine to cut a further panel-shaped material into workpieces in the laser cutting process.

15. The laser flatbed machine of claim 14, wherein the imaging system comprises one or more cameras, a stereo camera, a time-of-flight camera, or a lidar scanner.

16. The laser flatbed machine of claim 14, wherein the imaging system is attached to the panel cutting unit and image recordings of the imaging system are spatially calibrated with respect to a machine coordinate system of the panel cutting unit.

17. A method for cutting workpieces out of a panel-shaped material using a laser beam of a laser flatbed machine in the context of a cutting process, the method comprising:

providing a remaining panel-shaped material on a pallet, which is associated with a panel cutting unit of the laser flatbed machine, in a recording region of an imaging system of the laser flatbed machine;

creating a cutting plan for the cutting process on the remaining panel-shaped material, wherein creating the cutting plan comprises:

providing panel planning geometry data for planning the laser cutting process to be carried out using the laser flatbed machine, wherein providing the planning geometry data comprises:

outputting a pallet from the panel cutting unit of the laser flatbed machine, wherein a processed panel containing cut material and a remaining panel-shaped material surrounding the cut material lies on the pallet, providing the remaining panel-shaped material in a preparation region of the laser flatbed machine in a recording region of an imaging system, wherein the preparation region is separate from the panel cutting unit of the laser flatbed machine;

using the imaging system to produce an image recording of the remaining panel-shaped material that has one or more inner cutout regions from which material has been removed;

evaluating the image recording to determine a remaining panel outer contour of the remaining panel-shaped material;

evaluating the image recording to determine at least one of one or more inner cutout regions of the remaining panel-shaped material located inside the remaining panel outer contour, wherein the at least one inner cutout region is determined by (i) an inner cutout contour identified in the image recording, (ii) a threshold value analysis of the image recording, or (iii) both by an inner cutout contour identified in the image recording and by a threshold value analysis of the image recording;

deriving a remaining area of the remaining panel-shaped material using the remaining panel outer contour and the one or more inner cutout regions, wherein a laser cutting process can be based on the remaining area; and outputting panel planning geometry data that define the geometry of the remaining area, wherein during at least one of the steps above, using the panel cutting unit of the laser flatbed machine to cut a further panel-shaped material into workpieces in a cutting process; and arranging cutting contours on the remaining area determined by the panel planning geometry data, and creating a cutting plan using position data of the cutting contours;

reading the cutting plan into a control unit of the laser flatbed machine;

retracting the pallet with the remaining panel-shaped material into the panel cutting unit of the laser flatbed machine; and carrying out a cutting process corresponding to the read-in cutting plan on the remaining panel-shaped material.

\* \* \* \* \*